Feb. 13, 1968  D. W. ROLLINS ET AL  3,368,499
COLLAPSIBLE HITCH
Filed Feb. 7, 1966  12 Sheets-Sheet 1
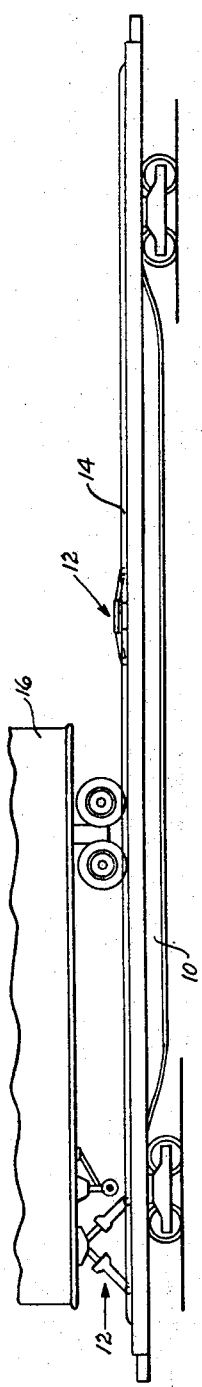
FIG. I.
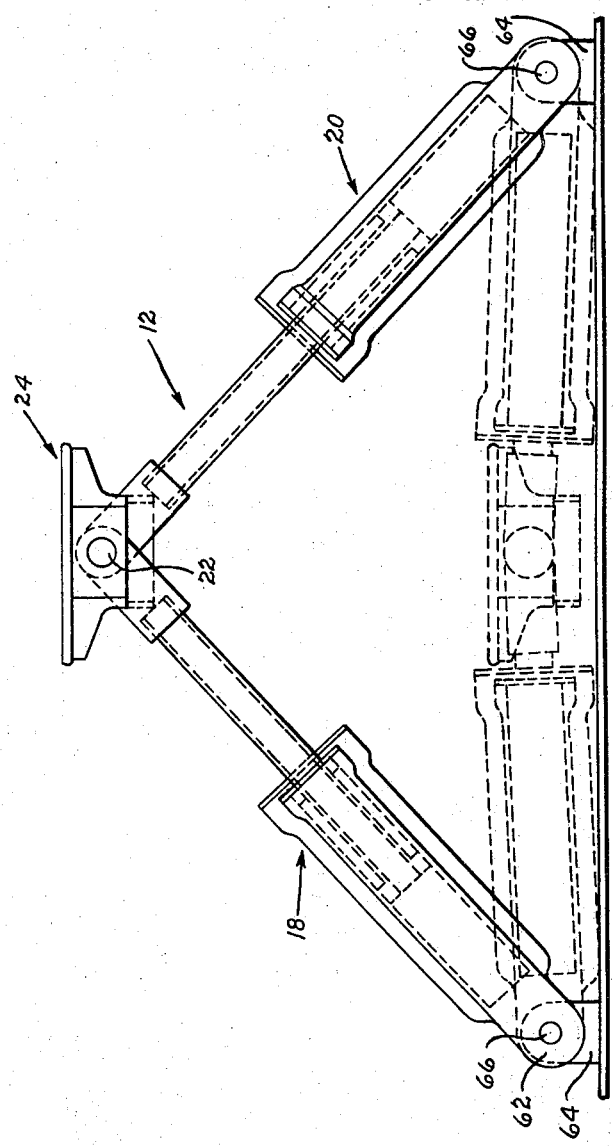
FIG. 2.
INVENTORS
DALLAS W. ROLLINS
RICHARD G. POWELL
BY Eugene N. Riddle
ATTORNEY

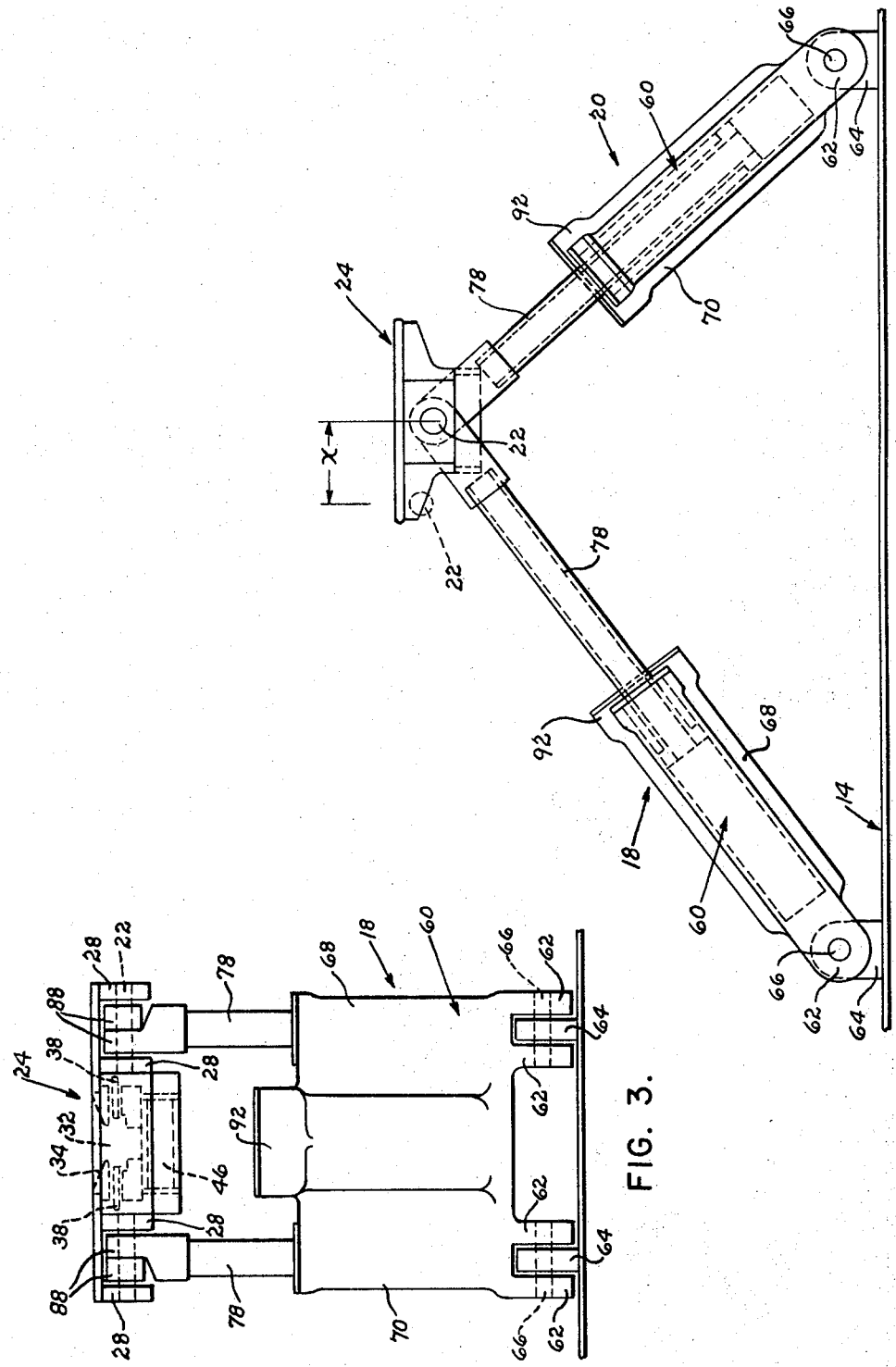

Feb. 13, 1968  D. W. ROLLINS ET AL  3,368,499
COLLAPSIBLE HITCH

Filed Feb. 7, 1966  12 Sheets-Sheet 3

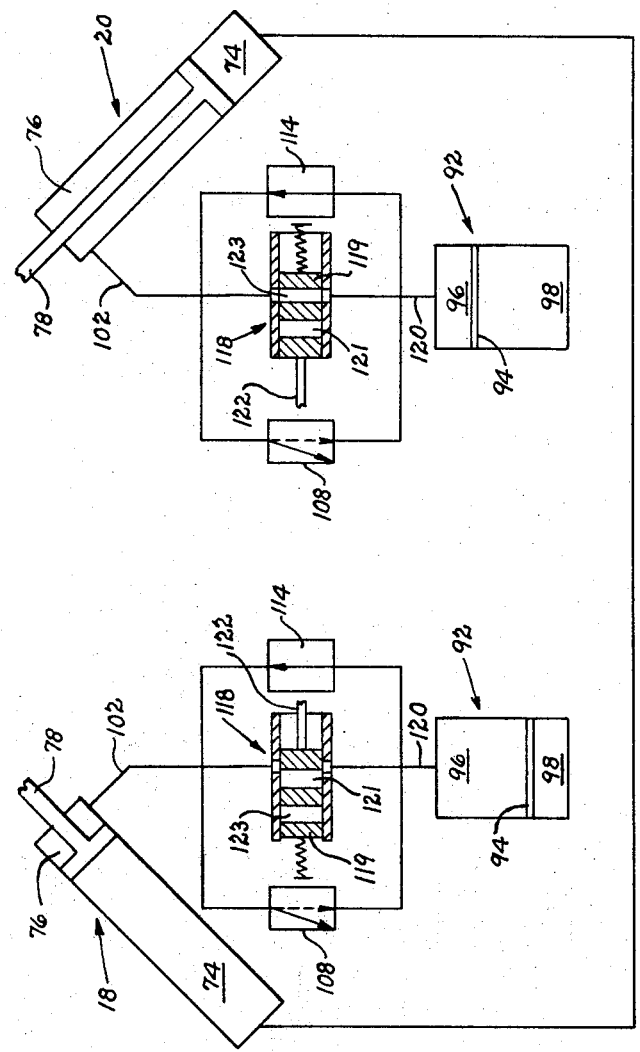
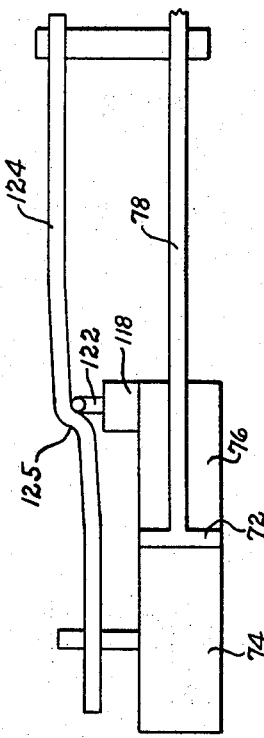
FIG. 11.
FIG. 12.

United States Patent Office 3,368,499
Patented Feb. 13, 1968

3,368,499
COLLAPSIBLE HITCH
Dallas W. Rollins, St. Charles, Mo., and Richard G. Powell, Houston, Tex., assignors to ACF Industries, Incorporated, New York, N.Y., a corporation of New Jersey
Filed Feb. 7, 1966, Ser. No. 529,602
16 Claims. (Cl. 105—368)

ABSTRACT OF THE DISCLOSURE

A collapsible hitch for securing the kingpin of a trailer on a railway flat car and having a pair of legs arranged in an inverted V-shape with each leg comprising reciprocable fluid pressure means for cushioning the hitch in addition to moving the hitch in a generally vertical direction between collapsed and erect positions. A fluid line provides fluid communication between the separate fluid pressure means of each leg to permit a flow of fluid therebetween thereby to provide a closed system with fluid flowing between the legs upon exertion of impact forces against the hitch. Fluid is metered from one of the legs when a predetermined fluid pressure is reached in the associated fluid pressure means thereby to minimize any continual back and forth movement of a trailer.

Background and description of the invention

The present invention is particularly directed to a collapsible hitch that is adapted to be raised and lowered by fluid pressure means with the fluid pressure means also being employed to cushion the erected hitch against buff and draft forces exerted against the railway car. The hitch comprises a pair of struts or legs pivotally connected adjacent their upper ends and arranged in an angular relation to each other with each leg including fluid pressure means having relatively movable portions adapted to be extended and retracted for extension and retraction of the respective leg. Each fluid pressure means has two fluid chambers separated by a movable piston. One of the chambers for one fluid pressure means is in fluid connection with the corresponding chamber of the other fluid pressure means to provide a free closed flow of fluid between the two chambers in the erect position of the hitch. Upon impact forces being exerted against the hitch, fluid will flow from the one chamber into a corresponding chamber of the other fluid pressure means resulting in an extension of one leg and a corresponding contraction of the other leg thereby to aid in cushioning of the impact forces.

The other fluid chambers not in fluid communication with each other are each in fluid communication with a separate fluid accumulator. Each fluid accumulator has a movable member separating the accumulator into a hydraulic fluid chamber of a relatively incompressible fluid and a fluid chamber of a relatively compressible fluid, such as air or nitrogen gas. Upon impact forces exerted against the hitch, fluid is metered from at least one of the fluid chambers into the hydraulic fluid chamber of the associated accumulator thereby to pressurize the compressible fluid for return of the hitch to its original position after the impact forces have been absorbed.

To eliminate a continual back and forth movement of a trailer secured to the hitch, the flow of fluid from a chamber into the associated fluid accumulator is restrained until a predetermined fluid pressure is reached thereby preventing any contraction or extension of the legs until such fluid pressure is reached from a minimum impact load.

It is an object of the present invention to provide a collapsible hitch that may be moved between collapsed and erect positions by hydraulic fluid pressure means.

A further object of the present invention is to provide such a collapsible hitch in which hydraulic fluid pressure means provides cushioning against impact and draft forces exerted against the hitch in addition to raising and lowering the hitch.

Another object of this invention is the provision of such a collapsible hitch supported by a pair of extensible legs arranged in an angular relation to each other with each leg having fluid pressure means so that upon the exertion of impact forces against the hitch one leg will be contracted while the other leg will be extended a corresponding amount for cushioning of the impact forces.

The invention accordingly comprises the constructions hereinafter described, the scope of the invention being indicated in the following claims.

In the accompanying drawings in which several of various possible embodiments of the invention are illustrated;

FIGURE 1 is a side elevation of a railway flat car illustrating hitches comprising the present invention in both erect and collapsed positions;

FIGURE 2 is an enlarged side elevation of the hitch comprising the present invention in an erect position, the dotted line indication thereof illustrating the hitch in a collapsed position;

FIGURE 3 is a front elevation of the hitch shown in FIGURE 2;

FIGURE 5 is a side elevation similar to FIGURE 2 but showing the hitch at the end of a cushioned movement with one leg extended and the other leg contracted;

FIGURE 6 is a section of the supporting plate structure for securing the kingpin of a trailer or the like;

FIGURE 11 is a schematic view similar to FIGURE 10 but illustrating the fluid system with one leg extended and the other leg contracted under an impact force exerted against the hitch;

FIGURE 12 is a schematic of the cam mechanism for actuating the metering valve controlling the flow of fluid;

Figure 17:
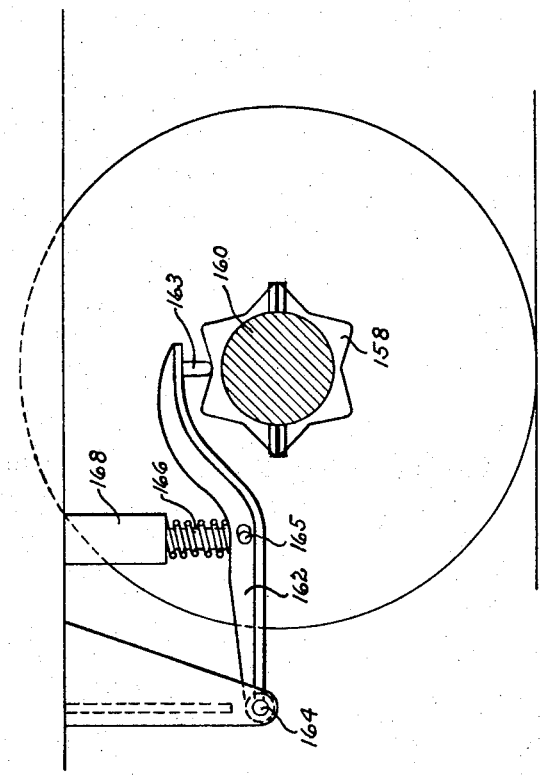
FIGURE 17 is a partial side elevation of a further modification of drive means for driving the fluid pump from a railway car axle.

Referring now to the drawings for a better understanding of this invention, and more particularly to FIGURE 1, a railway flat car generally indicated 10 is illustrated having a pair of hitches 12 comprising the present invention mounted on deck or floor 14. One hitch 12 on the end of flat car 10 is illustrated in an erect position secured to a kingpin of a trailer partially shown at 16. The other hitch 12 is illustrated in a collapsed position intermediate the ends of car 10.

Hitch 12 comprises a pair of legs or struts generally indicated 18 and 20 arranged at an angular relation to each other in an inverted V-shape in the erect position as shown in FIGURE 2. Legs 18 and 20 extend at about a forty-five (45) degree angle with respect to deck 14. The upper ends of legs 18 and 20 are pivotally connected about pivot 22 to a fifth wheel or supporting plate structure generally indicated 24 for securing the kingpin of trailer 16.

Figure 6:
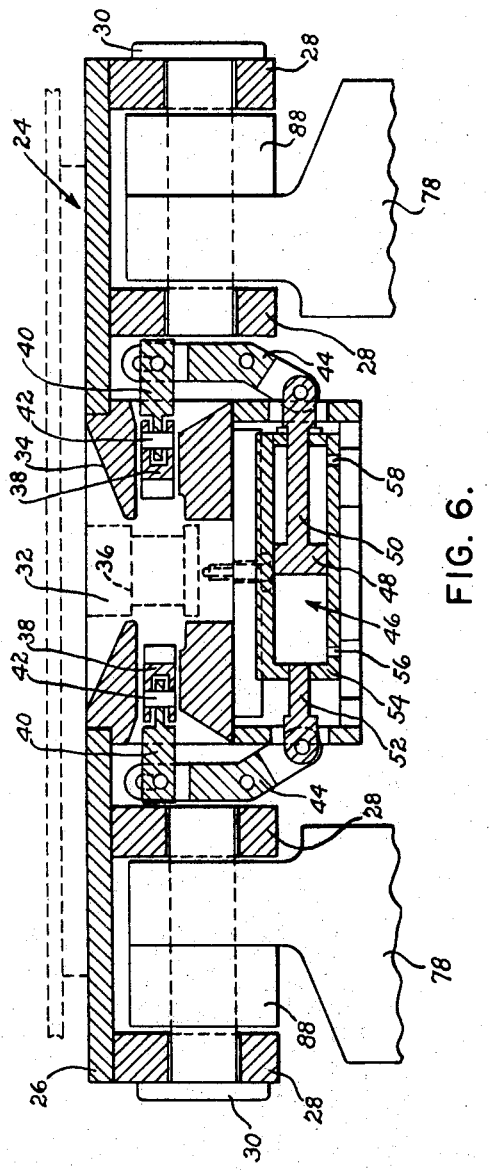

Referring to FIGURE 6 of the drawings, supporting plate structure 24 is illustrated and comprises an upper support plate 26 having ribs or lugs 28 which receive pins 30 forming pivot 22. Support plate 26 has a central opening 32 therein defined by a frusto-conical surface 34 which provides an inclined surface along which a kingpin 36 may easily slide to a centered position. Locking jaws 38 are mounted within slots for movement into and out of locking engagement with kingpin 36. An arm 40 is pivotally connected at 42 to each jaw 38. A link or lever generally designated 44 is connected to each arm 40. Hydraulic fluid pressure means 46 comprises a double acting cylinder including a piston 48 and an integral piston rod 50 secured to one link 44. Extending from the opposite end of hydraulic fluid pressure means 46 is a rod 52 secured to an end of cylinder body 54 and movable with the cylinder body. Rod 52 is secured to the other opposite link 44.

To close jaws 38 from the open position shown in FIGURE 6, fluid is supplied to port 56 to move piston 48 to the right as viewed in FIGURE 6 and cylinder body 54 to the left as viewed in FIGURE 6 thereby to move jaws 38 about kingpin 36 for securing the kingpin. To open jaws 38 from a closed position, fluid is supplied to port 58 to move jaws away from kingpin 36. For further details of supporting plate structure 24 reference is made to copending application of Dallas W. Rollins, Ser. No. 512,643, filed Dec. 9, 1965 and entitled "Collapsible Hitch," the entire disclosure of which is incorporated by this reference.

Figure 4:
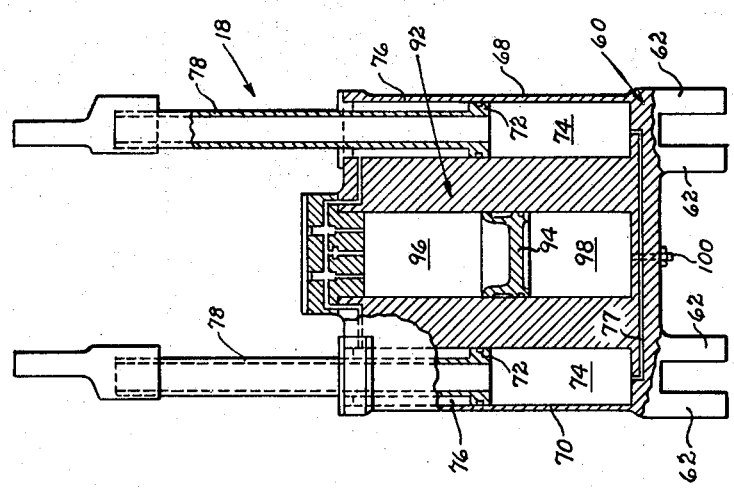
FIGURE 4 is a plan view with certain parts broken away of one leg or strut comprising the hitch shown in FIGURES 2 and 3.

Each leg 18, 20 is substantially identical and for the purposes of illustration only one leg is illustrated in detail. Referring particularly to FIGURES 2, 3 and 4, leg 18 comprises a base generally indicated 60 having extensions 62 on the lower end thereof connected to lugs 64 on deck plate 14 about pivots 66. Base 60 includes a pair of hydraulic fluid cylinders 68 and 70 each having a piston 72 dividing the respective cylinder into a lower hydraulic fluid chamber 74 and an upper hydraulic fluid chamber 76. Lower fluid chambers 74 for each leg are connected by fluid passageway 77 to permit a free flow of hydraulic fluid between the lower chambers 74 for each leg. A hollow piston rod 78 integral with each piston 72 is in fluid communication with lower fluid chamber 74.

Figure 9:
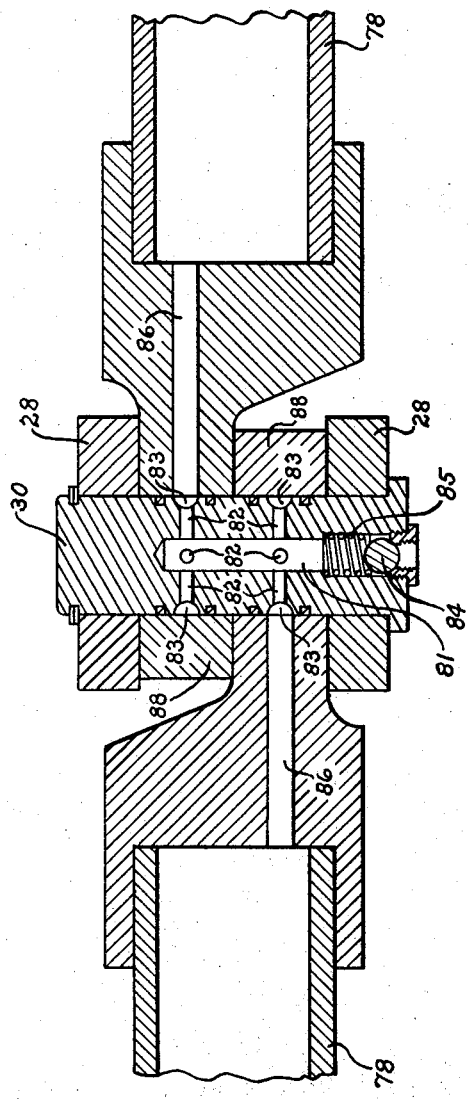
FIGURE 9 is an enlarged section illustrating a fluid connection at the pivotal connection of the legs for erection and collapsing of the hitch.

As shown in FIGURE 9, one of the pins 30 which connects piston rods 78 of legs 18, 20 has a central bore 81 therein. Side ports 82 radiate from central bore 81 and communicate with circumferential grooves 83 on pin 30. A check valve 84 in bore 81 is urged to closed position by spring 85. Fluid passages 86 in fingers 88 of piston rods 78 are in fluid communication with circumferential grooves 83. Thus, to supply fluid to lower fluid chambers 74, such as might be required for erection of hitch 12 from a collapsed position, a hydraulic fluid source may be connected adjacent bore 81 with a quick disconnect fitting opening check valve 84 thereby to supply hydraulic fluid to piston rods 78 through ports 82 and passageways 86. The lower fluid chambers 74 for each leg are connected by fluid line 77. Thus, fluid supplied from one pin 30 supplies chambers 74 for both legs 18, 20 to erect hitch 12 from a collapsed position. To collapse the hitch from its erect position, hydraulic fluid may be bled from bore 81 and the weight of the hitch will force hydraulic fluid from the lower fluid chambers 74 upon opening of check valve 81.

Figure 10:
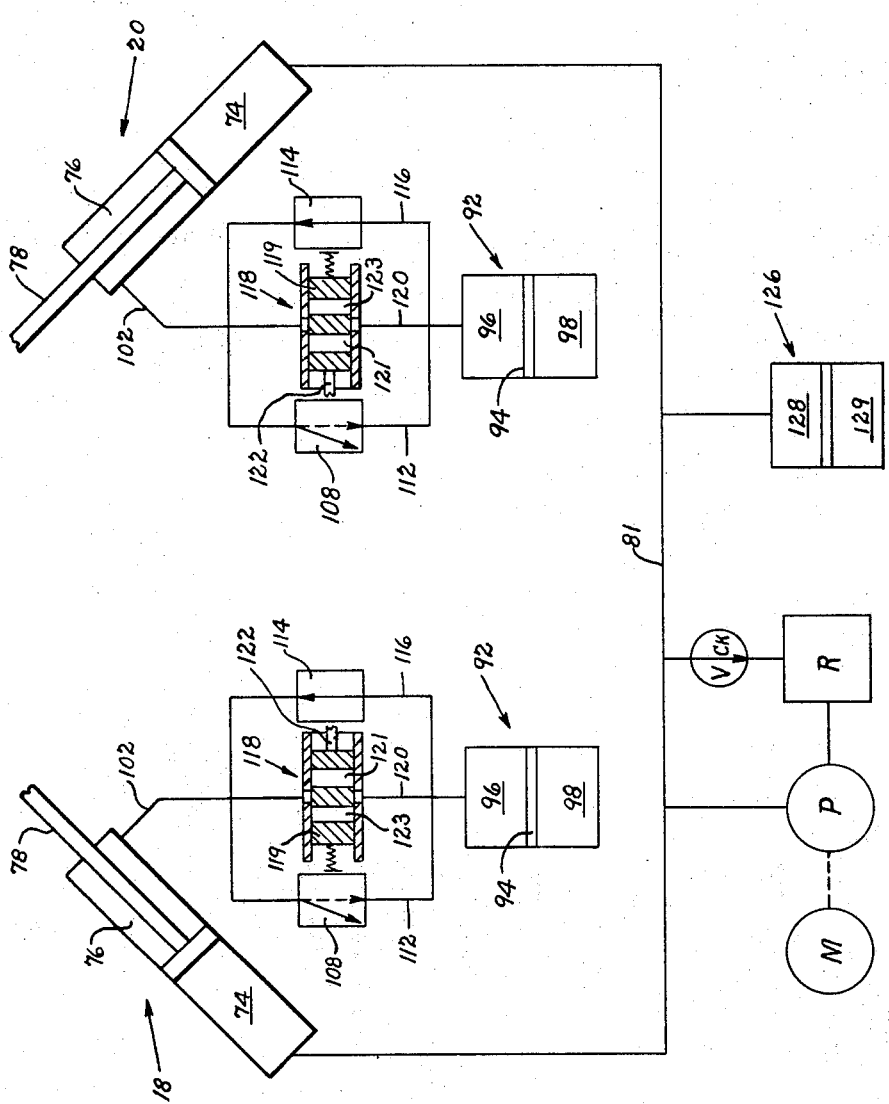
FIGURE 10 is a schematic view of the fluid system for actuating and cushioning the hitch shown in FIGURES 1-9 and illustrating the hitch in an erect neutral position.

To cushion hitch 12 against impact forces erected against railway car 10, means are provided to meter the flow of hydraulic fluid from the upper fluid chambers 76 of the leg being extended thereby to absorb the impact forces. Each leg has an accumulator generally indicated 92 as illustrated in FIGURES 4 and 10 and forming an integral part of the associated base 60. Accumulator 92 has a freely floating piston 94 separating an upper fluid chamber 96 having a relatively incompressible fluid therein, such as hydraulic fluid, and a lower fluid chamber 98 having a relatively compressible fluid therein, such as, for example, dry nitrogen gas or air. A fluid passage 100 as shown in FIGURE 4 communicates with chamber 98 to permit charging and bleeding of chamber 98.

Figure 8:
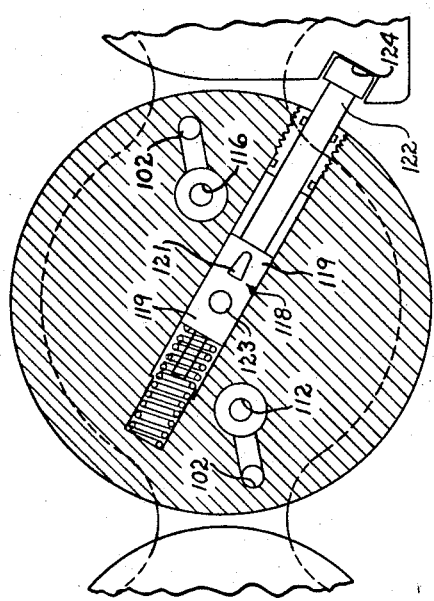
FIGURE 8 is a plan, certain parts broken away, illustrating a metering valve controlling the flow of fluid from the upper fluid chambers of a leg.
Figure 7:
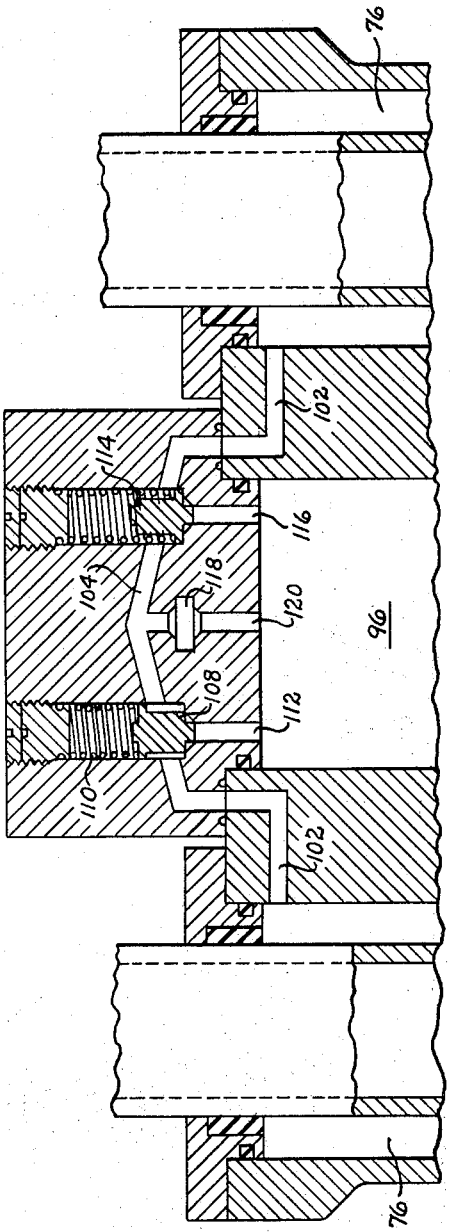
FIGURE 7 is an enlarged fragment of FIGURE 4 illustrating the fluid system connecting the upper fluid chambers of a leg.

Referring particularly to FIGURES 7 and 8, the upper fluid chambers 76 of each leg are in fluid communication with each other through fluid lines 102 and 104 to permit flow of fluid between chambers 76. A pressure relief valve 108 has a circumferential groove permitting in closed position a flow of fluid between upper chambers 76 of the associated leg. Spring 110 biases valve 108 to a closed position. A passageway 112 communicates with fluid chamber 96 and upon a predetermined fluid pressure being reached in chamber 76 valve 108 is actuated to permit a flow of fluid to chamber 96 and an extension of the associated leg. As valve 108 is only actuated at a predetermined fluid pressure in chamber 76, there is no continuous back and forth movement of the trailer secured to the hitch.

A check valve 114 in fluid line 116 to fluid chamber 96 permits a return flow of fluid to chamber 76 from chamber 96 after the impact forces have been absorbed. The pressure of the gas in chamber 98 is increased upon a downward movement of piston 94 and forces piston 94 upwardly to return fluid from chamber 96 to chamber 76 after the absorption of the impact forces.

To meter the flow of fluid from chamber 76 to chamber 96 when a predetermined fluid pressure is reached in fluid chamber 76, a metering valve 118 is mounted in fluid line 120 which communicates with fluid chamber 96. Metering valve 118 is a slide valve controlled by movement of an associated piston rod 78. Referring to FIGURES 8 and 12, valve 118 has a slide 119 with ports 123 and 121. Port 121 is generally V-shaped so that the initial travel of slide 119 opens port 121 to a full orifice and subsequent travel decreases the orifice as the width of the V-shaped port is decreased. The exact shape of port 121 is designed to provide the proper energy dissipating characteristics required by a particular application. A plunger 122 on slide 119 is controlled by the movement of cam rod 124 movable with piston rod 78. Cam rod 124 and valve 118 are illustrated in the neutral erect position of hitch 12 in FIGURES 10 and 12. As piston rod 78 is extended upon actuation of valve 108, plunger 122 rides along bend 125 and moves inwardly sharply to fully open port 121. A subsequent small inward movement of plunger 122 occurs. When piston rod 78 is contracted, plunger 122 is moved outwardly at a relatively uniform rate as a uniform degree of incline is provided along cam rod 124.

Operation is as follows:

Upon an impact force of a predetermined magnitude, such as 6,000 pounds, being exerted against the right hand end of railway car 10 as viewed in FIGURE 1, supporting plate structure 24 may move horizontally a distance X as shown in FIGURE 5 of around eight (8) inches, for example. Upon movement of supporting plate structure 24 leg 18 is extended while leg 20 is contracted thereby to absorb the impact. Referring particularly to FIGURE 11, upon a predetermined fluid pressure being reached in upper chamber 76 of leg 18 when impact forces are initially exerted against car 10, relief valve 108 of leg 18 is actuated permitting a flow of fluid from chamber 76 to chamber 96 and movement of associated piston rod 78. The extension of piston rod 78 initially opens metering valve 118 to a full orifice through port 121 and a metering of fluid from chamber 76 of leg 18 occurs. It should be noted that relief valve 108 is a limited flow device designed primarily to initiate extension of leg 18 to open the metering valve 118. Once the metering valve 118 is opened, the total fluid resistance is controlled by the metering orifice 121 and the relief valve orifice 112 combined if the force remains above 6000 pounds. If the force falls below 6000 pounds, the relief valve 108 closes and the metering valve orifice 121 is in singular control. The extension of leg 18 effects a flow of fluid from chamber 74 of leg 20 to chamber 74 of leg 18 thereby to contract leg 20. The contraction of leg 20 opens the associated metering valve 118 from the movement of piston rod 78. After the impact forces have been absorbed, pressurized gas in chamber 98 of leg 18 returns fluid to chamber 76 through check valve 114 and open metering valve 118 to return piston rod 78 to neutral position. Fluid from chamber 76 of leg 20 is returned to associated chamber 96 through open metering valve 118. When piston rods 78 reach their neutral position as shown in FIGURE 12, metering valves 118 close to hydraulically lock hitch 12 until a predetermined impact force is again reached.

When the hitch is moved to an erect position from a collapsed position, metering valves 118 are open since both legs 18, 20 are contracted. Fluid is supplied from pin 30 to chambers 74 until the piston rods 78 reach the neutral erect position shown in FIGURES 10 and 12 at which position valves 118 close to lock the hitch in erect position.

As shown in FIGURE 10 an accumulator generally indicated 126 is in fluid communication with fluid chambers 74 of legs 18, 20 and may be provided for vertical cushioning. Upon the fluid in chambers 74 reaching a predetermined fluid pressure from the weight of the trailer or a vertical impact, fluid may flow from chambers 74 to fluid chamber 128 of accumulator 126 to cushion the hitch in a vertical direction. Legs 18 and 20 both contract upon the flow of fluid to chamber 128. Pressurized gas in fluid chamber 129 returns legs 18 and 20 to original position.

A source of hydraulic fluid is mounted on railway car 10 and comprises a reservoir R connected to a fluid pump P. A hydraulic fluid motor M is provided to drive pump P. Fluid is supplied to pin 30 and line 81 from a quick disconnect fitting and the flow of fluid to chambers 74 extends legs 18 and 20 to erect the hitch.

Figure 13:
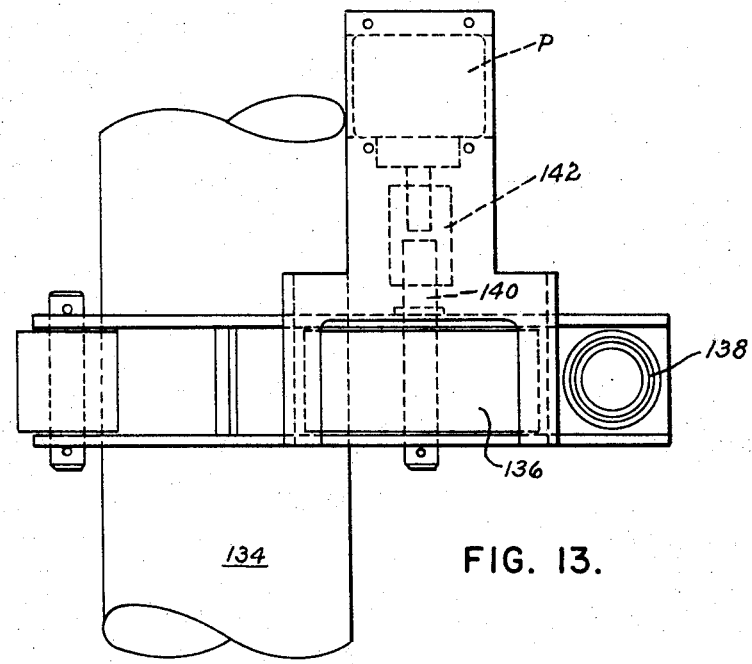
FIGURE 13 is a partial top plan of drive means for driving the fluid pump from a railway car axle.
Figure 14:
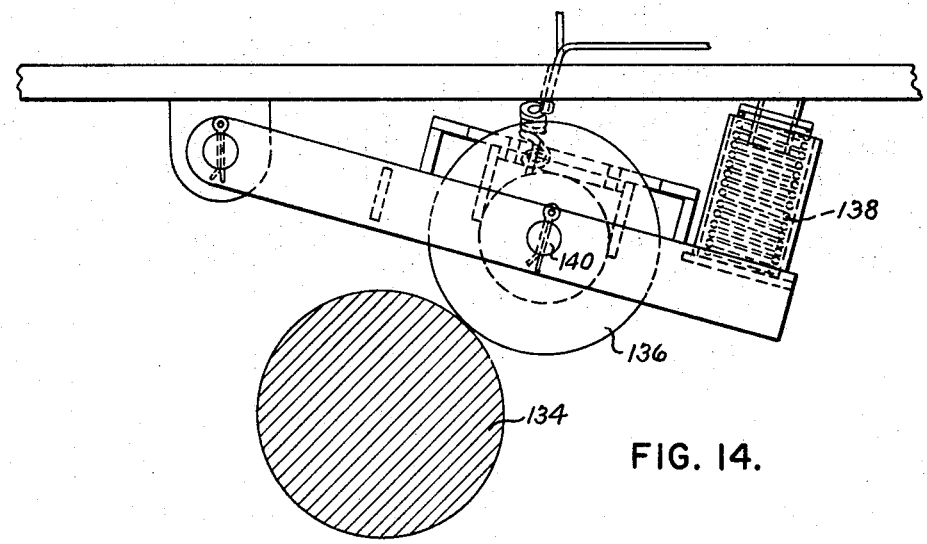
FIGURE 14 is a partial side elevation of the drive means shown in FIGURE 13.

Referring to FIGURES 13 and 14, an arrangement is illustrated for driving pump P from a railway car axle 134 of railway car 10. A drive roller 136 is urged into driving contact with axle 134 by spring 138. Roller 136 is secured to drive shaft 140 connected by a coupling 142 to pump P for driving pump P.

Figure 15:
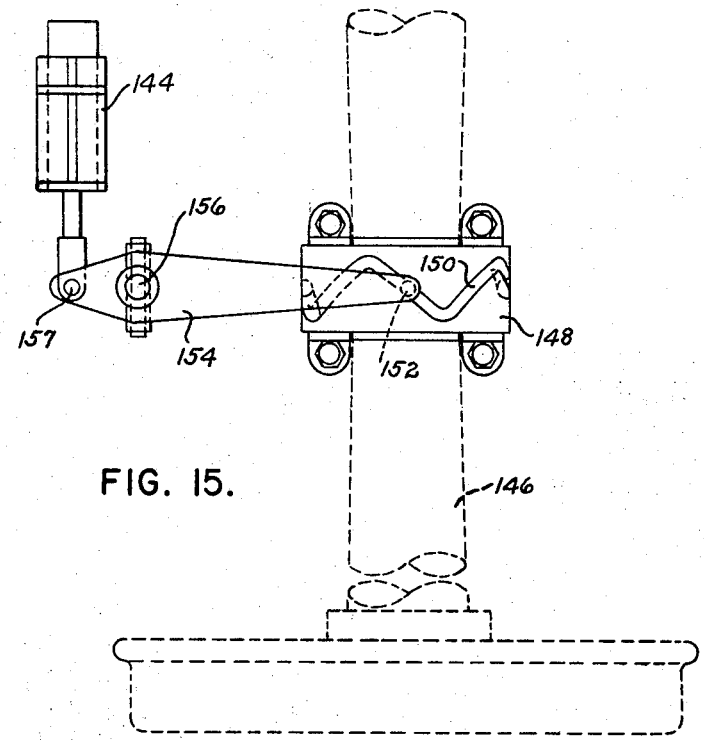
FIGURE 15 is a partial plan of a modification of the drive means for driving the fluid pump from a railway car axle employing a cam secured to the axle.
Figure 16:
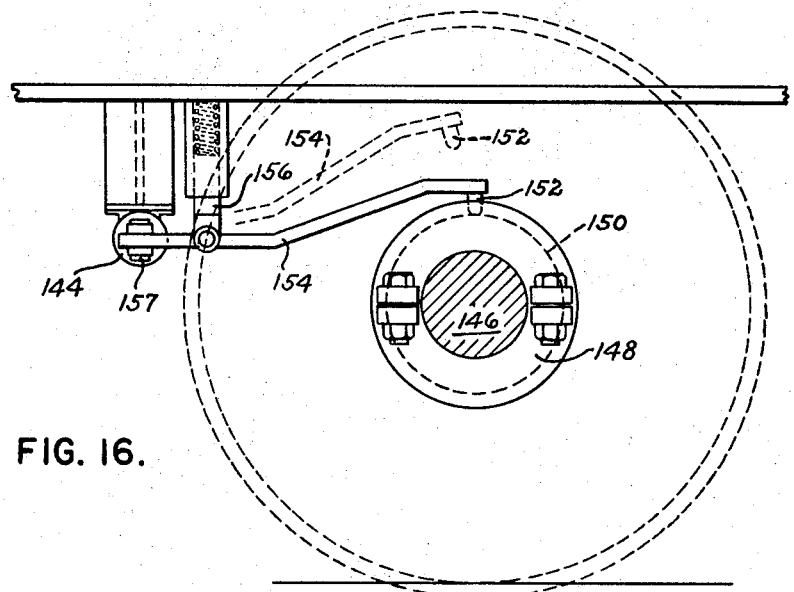
FIGURE 16 is a partial side elevation of the drive means shown in FIGURE 15.

Referring to FIGURES 15 and 16, a modified arrangement for driving a hydraulic fluid pump 144 from a railway car axle 146 is illustrated. Cam 148 is secured to axle 146 and has a cam groove 150. A follower 152 on cam lever 154 is mounted in groove 150. Lever 154 is pivoted about a vertical axis at 156 and is connected about vertical axis 157 to pump 144 to reciprocate pump 144 upon rotation of railway car axle 146.

Referring to FIGURE 17, a further modification is illustrated in which cam 158 is secured to axle 160. A cam lever 162 has a follower 163 riding along cam 158. Lever 162 is pivotally supported about horizontal axis 164 and is connected about horizontal axis 165 to piston rod 166 of pump 168. Pump 168 is driven upon rotation of axle 160 and cam 158.

Figure 18:
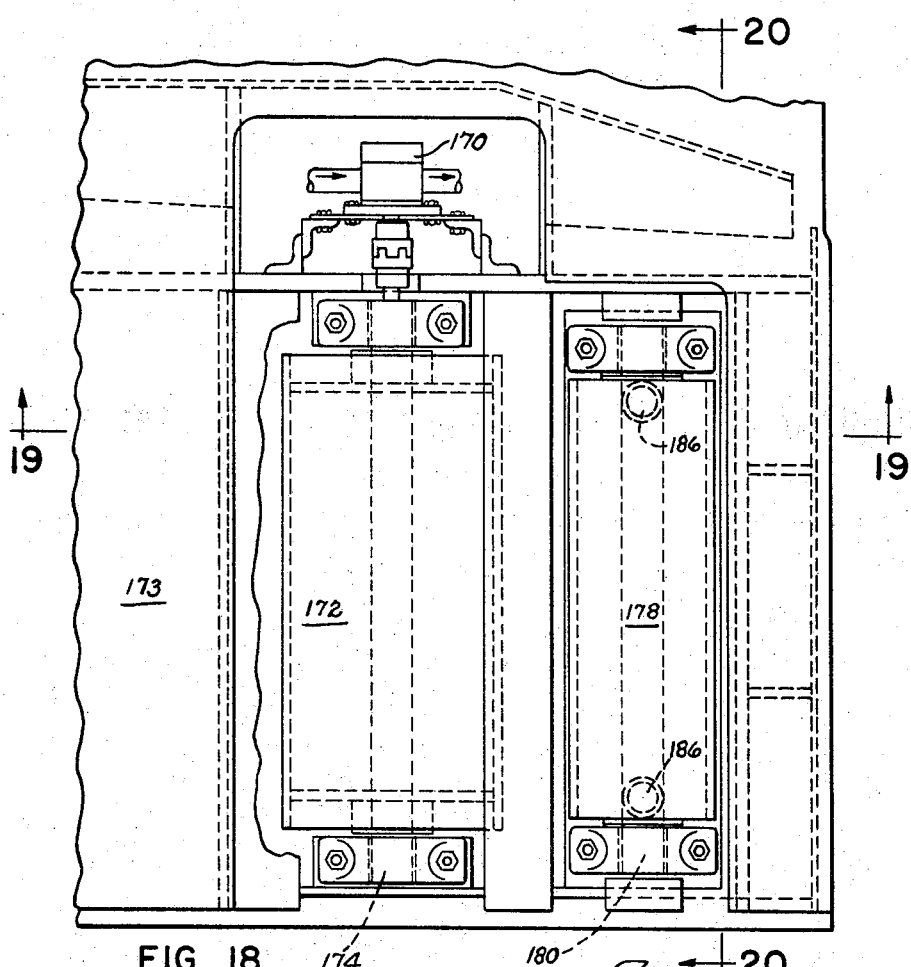
FIGURE 18 is a partial plan of a drive means for driving the fluid pump from the roadway wheel of a tractor or the like and employing a treadmill arrangement.
Figure 19:
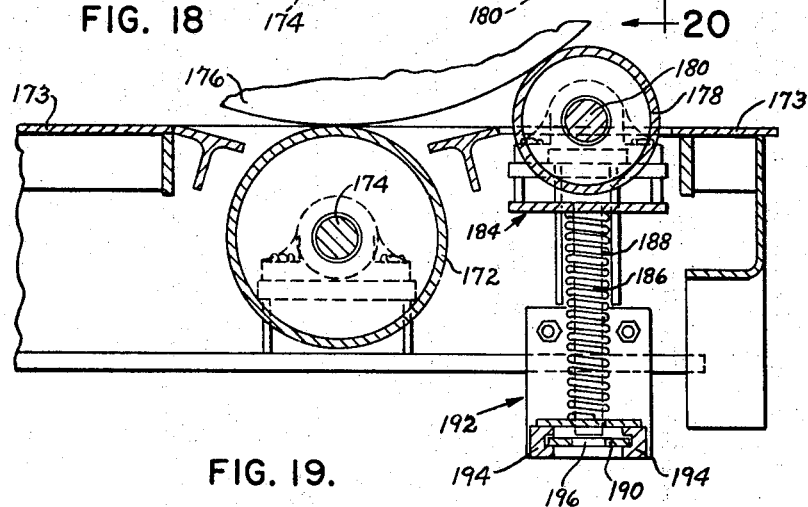
FIGURE 19 is a section taken generally along line 19—19 of FIGURE 18.
Figure 20:
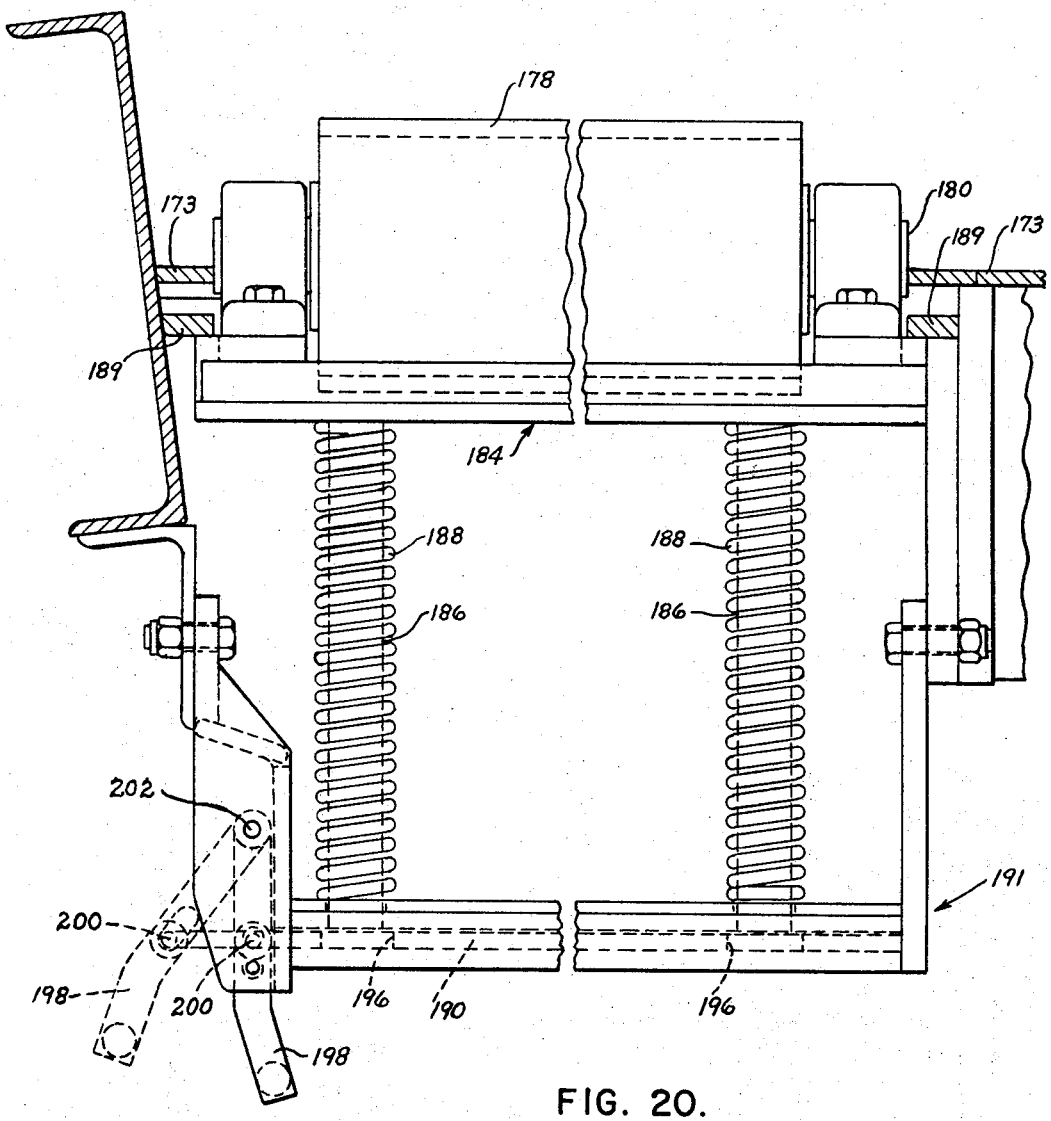
FIGURE 20 is a section taken generally along line 20—20 of FIGURE 18.

Referring to FIGURES 18, 19, and 20, another embodiment is shown in which a hydraulic fluid pump 170 is driven from the roadway wheels of a tractor or the like in a treadmill arrangement. A drive roller 172 is mounted on drive shaft 174 which is connected in a driving relation to pump 170. A cutout portion of deck 173 exposes drive roller 172 and a roadway wheel partially shown at 176 is adapted to rest on drive roller 172. To position roadway wheel 176 accurately and to aid in holding wheel 176 in position, an idler roller 178 is mounted on shaft 180. Roller 178 is adapted to be selectively depressed below the floor or deck 173 of railway car 10 when not in use. For this purpose, roller 178 is mounted on a depressible frame 184 having depending rods 186. Springs 188 urge frame 184 upwardly into engagement with stops 189 secured to the underframe of railway car 10. A latch bar 190 is mounted for sliding movement in a V-shaped hanger bar generally indicated 192 secured to car 10. Side guides 194 of hanger bar 192 receive latch bar 190 for sliding movement. Bar 190 has openings 196 in alignment with rods 186 to permit a downward movement of frame 184 when not in use. A handle 198 is pivotally connected at 200 to latch bar 190 and is pivotally supported at 202 from hanger bar 191. When in drive position, handle 198 is pivoted to the broken line indication thereof in FIGURE 20 to place openings 196 out of alignment with rods 186. Thus, roadway wheel 176 will not depress frame 184 and idler roller 178 will accurately position roadway wheel 176.

Figure 21:
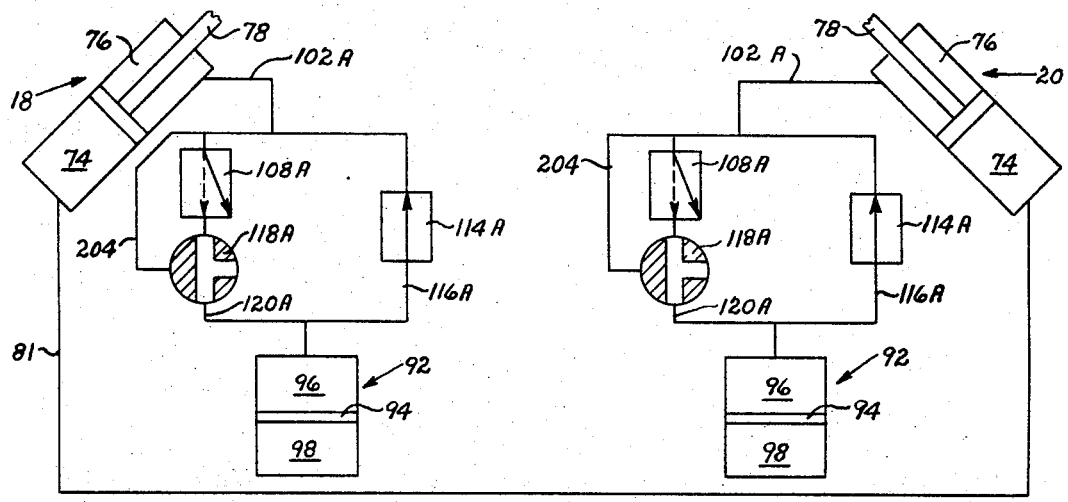
FIGURE 21 is a schematic view of a modified fluid system for cushioning the hitch illustrating the hitch in erect position.
Figure 22:
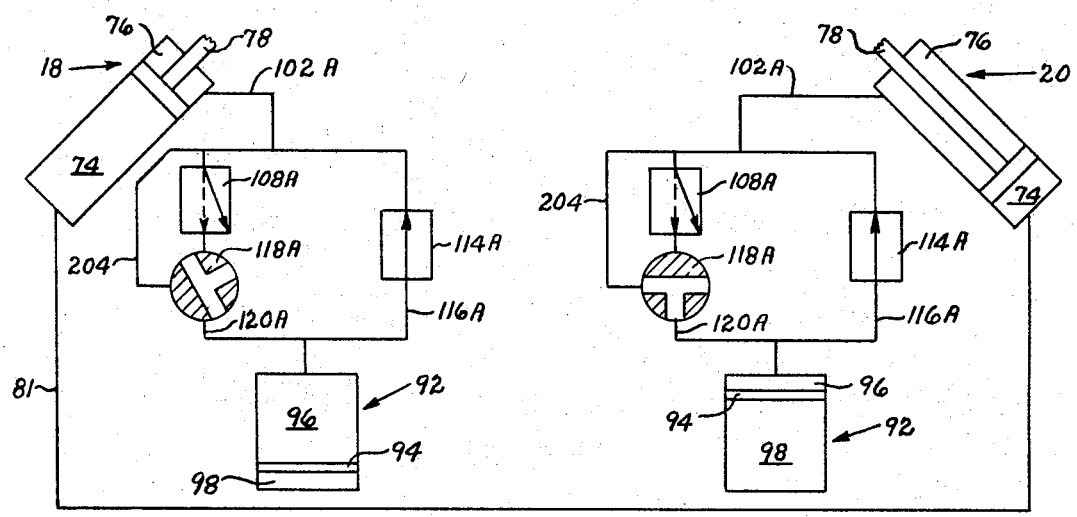
FIGURE 22 is a schematic view of the modified fluid system shown in FIGURE 21 but illustrating the fluid system when an impact force is exerted against the hitch.
Figure 23:
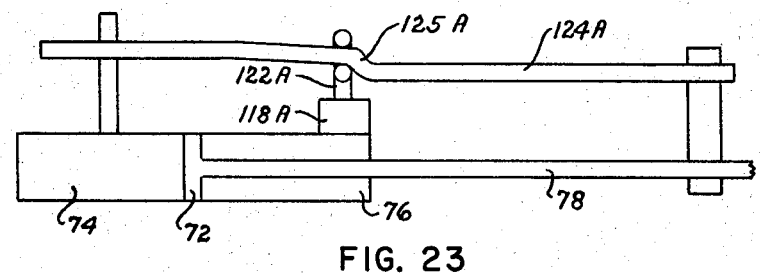
FIGURE 23 is a schematic view of the cam mechanism for actuating the metering valves for the fluid system illustrated in FIGURES 21 and 22.

Referring to FIGURES 21, 22 and 23, a modified fluid arrangement is illustrated schematically. FIGURES 21 and 23 illustrate the fluid system when hitch 12 is in an erect neutral position. Fluid line 102A extends between chambers 76 of each leg 18, 20. A pressure relief valve 108A is in series with a metering valve 118A. Metering valve 118A is a three-way valve and a bypass fluid line 204 permits a fluid flow through metering valve 118A when fluid line 120A is in fluid communication with line 204 through metering valve 118A thereby to bypass relief valve 108A. A check valve 114A in fluid line 116A permits a return flow of fluid to chamber 76 from chamber 96 after impact forces have been absorbed. Metering valve 118A is controlled by movement of an associated piston rod 78 as shown in FIGURE 23 with plunger 122A actuated by cam 124A. Cam 124A has a sharp drop or bend 125A to permit valve 118A to be initially opened through bypass line 204 upon contraction of the associated piston rod 78.

Operation for the modified fluid system illustrated in FIGURES 21, 22 and 23 is as follows:

Upon an impact force of a predetermined magnitude being exerted against the right hand end of railway car 10 as viewed in FIGURE 1, leg 18 is extended and the associated relief valve 108A is actuated permitting a flow of fluid from chamber 76 through metering valve 118A to accumulator 92. The extension of piston rod 78 slowly closes metering valve 118A thereby providing a fluid orifice decreasing in size as the piston rod extends. When the impact forces are absorbed, a lowering of fluid pressure in chamber 76 results in the closing of relief valve 108A to stop the movement of leg 18. However, if the fluid pressure in chamber 76 remains above the predetermined magnitude, metering valve 118A will close as shown in FIGURE 22 to stop the metering of fluid. Then, pressurized gas in chamber 98 of leg 18 returns fluid to chamber 76 through line 116A and check valve 114A thereby to return leg 18 to neutral position. Check valve 114A closes when leg 18 reaches neutral position.

The other leg 20, upon the exertion of impact forces, is contracted with metering valve 118A immediately opening upon movement of the associated piston rod 78 and a downward movement of plunger 122A along bend 125A as shown in FIGURE 23. Fluid for leg 20 is supplied from chamber 96 to chamber 76 through metering valve 118A and through check valve 114A. After the impact forces have been absorbed, fluid from chamber 76 of leg 20 is returned to chamber 96 through bypass line 204 and open metering valve 118A. When the associated piston rod 78 of leg 20 reaches its neutral position as shown in FIGURE 23, bypass line 204 is closed and metering valve 118A returns to open position with respect to relief valve 108A.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A support structure for cushioning generally horizontal forces exerted against a mass, comprising, a base support, an upper support plate connected to the mass for movement therewith, at least a pair of legs connected to the support plate and extending downwardly therefrom in an angular relation to each other, each of said legs including separate reciprocable fluid pressure means having relatively movable portions adapted to be extended and contracted, one of said relatively movable portions being connected to said support plate and the other of said portions being connected to said base support, and means to supply fluid to said fluid pressure means to contract and extend said legs, the contraction of said legs from an erect position of the support structure moving the support plate in a generally vertical direction to a collapsed position and the extension of said legs from a collapsed position moving the support plate in a generally vertical direction to an erect position, said movement of the support plate between collapsed and erect positions being effected, respectively, by the simultaneous exhaust and supply of fluid to the fluid pressure means of said pair of legs, one of said legs being contracted and the other of said legs being extended upon the exertion of said forces against said mass to provide a cushioned movement, said fluid pressure means upon the respective contraction and extension of said legs absorbing energy for cushioning the mass.

2. A collapsible hitch adapted to secure the kingpin of a trailer or the like comprising, a base support, an upper support plate adapted to engage and secure the kingin of a trailer for transit, a pair of legs connected to the support plate and extending downwardly therefrom in an angular relation to each other, each of said legs comprising fluid pressure means having relatively movable portions adapted to be extended and contracted, one of said relatively movable portions being connected to said support plate and other of said portions being connected to said base support, means to supply fluid to said support plate and the other of said portions being traction of said legs from an erect position of the support structure moving the support plate in a generally vertical direction to a collapsed position and the extension of said legs from a collapsed position of the support structure moving the support plate in a generally vertical direction to an erect position, said movement of the support plate between collapsed and erect positions being effected, respectively, by the simultaneous exhaust and supply of fluid to the fluid pressure means of said pair of legs, one of said legs being contracted and the other of said legs being extended upon impact forces exerted against the hitch to provide a cushioned movement, means to meter a flow of fluid from at least one fluid pressure means upon the exertion of said impact forces, and means permitting said metered flow of fluid from said one fluid pressure means when a predetermined fluid pressure is reached in said one fluid pressure means thereby to cushion said hitch.

3. A collapsible hitch as set forth in claim 2 wherein each of said fluid pressure means comprises at least one hydraulic fluid cylinder having a piston and an associated piston rod extending upwardly therefrom, the piston rod of one leg being pivotally connected to the piston rod of the other leg about a pivot on the support plate, each of said piston rods being hollow and in fluid communication with the interior of its associated fluid cylinder, and means providing fluid communication between said connected piston rods to permit a flow of fluid between said fluid pressure means.

4. A collapsible hitch as set forth in claim 2 wherein each of said fluid pressure means comprises a hydraulic fluid cylinder having a piston rod extending upwardly therefrom in the erect position of the hitch, a fluid line connecting the hydraulic fluid cylinders for the legs to permit a free flow of fluid between the legs thereby to provide a closed fluid system with the extension of one piston rod and associated leg resulting in a corresponding contraction of the other piston rod and associated leg.

5. A collapsible hitch as set forth in claim 2 wherein each of said fluid pressure means comprises a hydraulic fluid cylinder and a piston separating the cylinder into an upper and a lower fluid chamber in the erect position of the hitch, means providing fluid communication between the lower fluid chambers of the fluid pressure means to permit a free flow of fluid between the lower chambers thereby to provide a closed fluid system between the lower fluid chambers, the extension of one leg and the contraction of the other leg upon the exertion of impact forces resulting in a flow of fluid from the leg being contracted to the leg being extended.

6. A collapsible hitch as set forth in claim 5 wherein said means to meter a flow of fluid comprises means to meter the flow of fluid from the upper fluid chamber of each fluid pressure means upon the exertion of impact forces against the hitch and the extension of the respective leg, and means to return the fluid to the upper fluid chamber after the absorption of the impact forces from the metered flow of fluid from the upper fluid chamber thereby returning the hitch to its original erect position.

7. A collapsible hitch as set forth in claim 6 wherein said means to return the fluid comprises an accumulator having a floating piston dividing the accumulator into a fluid chamber of a relatively incompressible fluid to receive the fluid from the upper fluid chamber and a fluid chamber of a compressible fluid whereby the pressure of said compressible fluid is increased upon the flow of incompressible fluid into the accumulator and thereby returns the incompressible fluid to the upper fluid chamber of the fluid pressure means.

8. A support structure for cushioning forces exerted against a mass comprising, an upper support plate connected to the mass for movement therewith, at least a pair of legs connected to the support plate and extending downwardly therefrom in an angular relation to each other, each of said legs comprising a hydraulic fluid pressure means having relatively movable parts adapted to be extended for extension of the associated leg and to be contracted for contraction of the associated leg, means to supply fluid to said hydraulic fluid pressure means, said upper support plate being movable between collapsed and erect positions in a generally vertical direction upon a respective simultaneous exhaust and supply of fluid to the fluid pressure means of said pair of legs, each fluid pressure means comprising a hydraulic fluid cylinder and a piston separating the cylinder into two fluid chambers, and means to meter the flow of fluid from one of the chambers of each cylinder upon the exertion of forces against the mass, said means to meter the flow of fluid being actuated at a predetermined high fluid pressure in the respective fluid chamber.

9. A support structure as set forth in claim 8 wherein means are provided to return the fluid to said one chamber upon the absorption of forces from the metering of the fluid.

10. A support structure as set forth in claim 9 wherein said means to return the fluid comprises an accumulator for each fluid pressure means having a floating piston dividing the accumulator into a fluid chamber of a relatively incompressible fluid to receive the fluid from said one fluid chamber and a fluid chamber of a compressible fluid whereby the pressure of said compressible fluid is increased upon the flow of incompressible fluid into the accumulator and thereby returns the incompressible fluid to said one fluid chamber.

11. A railway flat car having at least one wheel and axle assembly adjacent each end thereof, a supporting base structure including a deck extending between the wheel and axle assemblies and adapted to support a trailer or the like, a collapsible hitch mounted on said supporting base structure and having an upper support plate adapted to secure the kingpin of a trailer or the like, said hitch comprising at least a pair of legs connected to the support plate and extending downwardly therefrom in an angular relation to each other, each of said legs comprising reciprocable fluid pressure means having relatively movable portions adapted to be extended and contracted, one of said portions being connected to said support plate and the other of said portions being connected to said supporting base structure, means to supply fluid to said fluid pressure means to extend said legs, the contraction of said legs from an erect position of the hitch moving the hitch to a collapsed position and the extension of said legs from a collapsed position of the hitch moving the hitch in a generally vertical direction to an erect position, said movement of the hitch between collapsed and erect positions being effected, respectively, by the simultaneous exhaust and supply of fluid to the fluid pressure means of said pair of legs, a hydraulic fluid system to provide fluid for said fluid pressure means, said system including a reservoir and a pump to supply fluid from the reservoir to the fluid pressure means, means providing fluid communication between said pump and said fluid pressure means, and drive means for said pump.

12. A support structure for cushioning forces exerted against a mass comprising, an upper support plate connected to the mass for movement therewith, at least a pair of legs connected to the support plate and extending downwardly therefrom in an angular relation to each other, each of said legs comprising a hydraulic fluid pressure means having relatively movable parts adapted to be extended for extension of the associated leg and to be contracted for contraction of the associated leg, each fluid pressure means comprising a hydraulic fluid cylinder and a piston separating the cylinder into two fluid chambers, means to meter the flow of fluid from one of the chambers of each cylinder upon the exertion of forces against the mass and being actuated at a predetermined high fluid pressure in the respective fluid chamber, a fluid conduit between the other fluid chambers of said cylinders to permit a free flow of fluid between said other fluid chambers thereby to provide a closed fluid system, and an accumulator in fluid communication with said other fluid chambers to provide a vertical cushioning for said support structure, said accumulator having a floating piston dividing the accumulator into a fluid chamber of a relatively incompressible fluid to receive fluid from said closed fluid system and a fluid chamber of a compressible fluid whereby the pressure of said compressible fluid is increased upon the flow of incompressible fluid into the accumulator to return the incompressible fluid to the closed fluid system.

13. A support structure for cushioning forces exerted against a mass comprising, an upper support plate connected to the mass for movement therewith, at least a pair of legs connected to the support plate and extending downwardly therefrom in an angular relation to each other, each of said legs comprising a hydraulic fluid pressure means having relatively movable parts adapted to be extended for extension of the associated leg and to be contracted for contraction of the associated leg, each fluid pressure means comprising a hydraulic fluid cylinder and a piston separating the cylinder into two fluid chambers, means for metering the flow of fluid from one of the chambers of each cylinder upon the exertion of forces against the mass and including valve means actuated at a predetermined high fluid pressure to permit movement of the associated piston, and cam means actuated by movement of said piston to control said valve means for metering the flow of fluid.

14. A support structure as set forth in claim 13 wherein said valve means is operable to permit a return flow of fluid to the respective fluid chamber after cushioning of forces exerted against said mass, said cam means controlling said valve means for return of fluid to the respective fluid chambers.

15. A railway flat car having at least one wheel and axle assembly adjacent each end thereof, a supporting base structure including a deck extending between the wheel and axle assemblies and adapted to support a trailer or the like, a collapsible hitch mounted on said supporting base structure and having an upper support plate adapted to secure the kingpin of a trailer or the like, said hitch comprising at least a pair of legs connected to the upper support plate and extending downwardly therefrom in an angular relation to each other, each of said legs comprising reciprocable fluid pressure means having relatively movable portions adapted to be extended and contracted, one of said portions being connected to said upper support plate and the other of said portions being connected to said supporting base structure, means to supply fluid to said fluid pressure means to extend said legs, the contraction of said legs from an erect position of the hitch moving the hitch to a collapsed position and the extension of said legs from a collapsed position of the hitch moving the hitch to an erect position, a hydraulic fluid system to provide fluid for said fluid pressure means, said system including a reservoir and a pump to supply fluid from the reservoir to the fluid pressure means, means providing fluid communication between said pump and said fluid pressure means, a friction drive pulley beneath the deck of the railway flat car adapted to selectively engage an axle of an adjacent wheel and axle assembly of the railway car, and means operatively connecting the drive pulley to said pump for driving said pump.

16. A railway flat car having at least one wheel and axle assembly adjacent each end thereof, a supporting base structure including a deck extending between the wheel and axle assemblies and adapted to support a trailer or the like, a collapsible hitch mounted on said supporting base structure and having an upper support plate adapted to secure the kingpin of a trailer or the like, said hitch comprising at least a pair of legs connected to the upper support plate and extending downwardly therefrom in an angular relation to each other, each of said legs comprising reciprocable fluid pressure means having relatively movable portions adapted to be extended and contracted, one of said portions being connected to said upper support plate and the other of said portions being connected to said supporting base structure, means to supply fluid to said fluid pressure means to extend said legs, the contraction of said legs from an erect position of the hitch moving the hitch to a collapsed position and the extension of said legs from a collapsed position of the hitch moving the hitch to an erect position, a hydraulic fluid system to provide fluid for said fluid pressure means, said system including a reservoir and a pump to supply fluid from the reservoir to the fluid pressure means, means providing fluid communication between said pump and said fluid pressure means, a friction drive roller projecting above the deck of the railway car and adapted to be in driving contact with at least one roadway wheel of a tractor or the like, means connecting the drive pulley to the pump for driving said pump, and means to position accurately the roadway wheel in frictional contact with the drive roller for rotating the roller and driving said pump.

References Cited

UNITED STATES PATENTS

| | | | |
|---|---|---|---|
| 2,124,124 | 7/1938 | Schoepf et al. | 105—199 |
| 2,929,338 | 3/1960 | Lich | 105—199 |
| 2,934,028 | 4/1960 | Travilla | 105—199 |
| 2,976,964 | 3/1961 | Thompson | 280—438 |
| 3,143,083 | 8/1964 | Gutridge et al. | 105—368 |
| 3,167,288 | 1/1965 | Farabaugh | 248—119 |

ARTHUR L. LA POINT, *Primary Examiner.*

DRAYTON E. HOFFMAN, *Examiner.*

UNITED STATES PATENT OFFICE
CERTIFICATE OF CORRECTION

Patent No. 3,368,499                                February 13, 1968

Dallas W. Rollins et al.

It is hereby certified that error appears in the above numbered patent requiring correction and that the said Letters Patent should read as corrected below.

Column 7, line 72, strike out "to said support plate and the other of said portions being" and insert instead -- to said fluid pressure means to extend said legs, the con- --.

Signed and sealed this 29th day of April 1969.

(SEAL)
Attest:

Edward M. Fletcher, Jr.
Attesting Officer

EDWARD J. BRENNER
Commissioner of Patents